C. S. LOCKWOOD.
CAGE WITH LOCKING SPACE BARS.
APPLICATION FILED DEC. 2, 1918.

1,318,092. Patented Oct. 7, 1919.

Inventor.
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

CAGE WITH LOCKING SPACE-BARS.

1,318,092.   Specification of Letters Patent.   Patented Oct. 7, 1919.

Application filed December 2, 1918. Serial No. 264,919.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Cages with Locking Space-Bars, fully described and represented in the following specification and the accompanying drawings, forming a part of the same.

This invention relates to a cage for guiding the rolls of a roller bearing in their movement around the hub; and the object of the invention is to furnish a new means of securing the rolls in the roll-spaces of the cage. This means consists of a special formation for the outer edges of the space-bars by which they may be readily expanded or upset to retain the rolls in the spaces between the bars.

To secure the characteristics required in this cage, it is cast of some malleable metal like brass, which is adapted to yield under pressure and thus permit the expanding of the space-bars at the line where such expansion would contract the roll-spaces.

Figure 1:
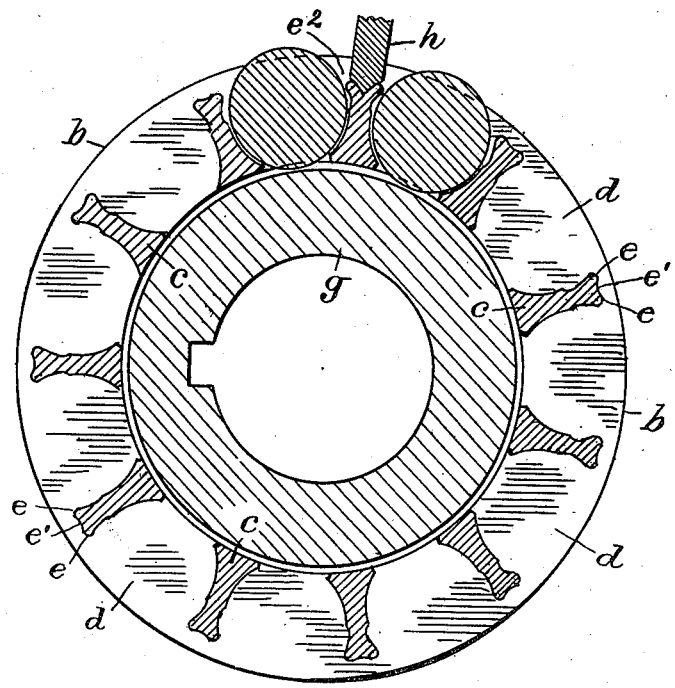
Figure 2:
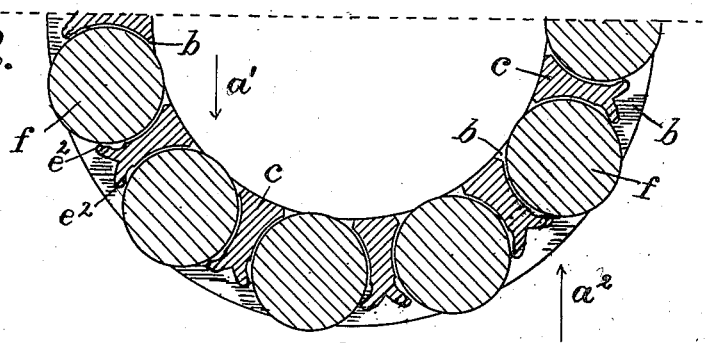
Figure 3:
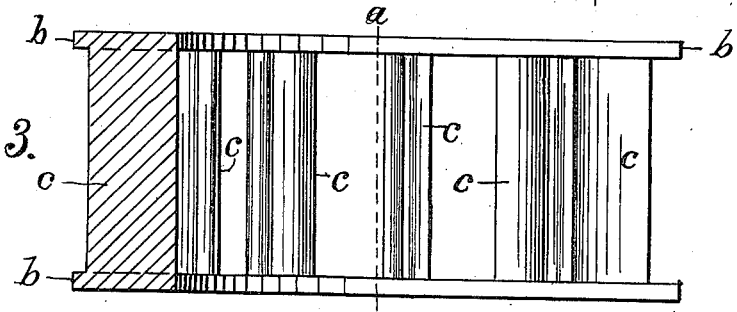

The invention will be understood by reference to the annexed drawing, in which Figure 1 is an end view of a hub with a cage thereon, the cage being in transverse section at the middle of its length; Fig. 2 is a transverse section of one-half of such a cage with the rolls secured therein; Fig. 3 shows the cage without the rolls, the view at the left-hand side of the line $a$—$a$ is a plan of the half cage shown in Fig. 2, viewed from the inside in the direction of the arrow $a'$. At the right-hand side of Fig. 3, the view is an external view of the cage in the direction of the arrow $a^2$ in Fig. 2.

The cage is shown with heads $b$ connected by integral tie-bars $c$ which are made of suitable number and proportioned to form roll-spaces $d$ for all the rolls with the bars $c$ operating as spacers between the rolls.

The space-bars have concave sides which produce a widening of their inner and outer edges, and form sockets or roll-spaces having curved walls adapted loosely to fit the rolls and support their entire length. The rolls are shown as plain cylinders projecting beyond the inner and outer lines of the cage-head to contact with a hub $g$, and a casing.

To provide for the expanding or upsetting of the space-bars after the rolls are inserted in the cage, the outer edges of the said bars are projected considerably beyond the center line of the rolls, and the head or outer edge of each space-bar is widened by the concavity of its sides.

The outer edges of the space-bars are so proportioned as to clear the rolls when inserting them in the roll-spaces $d$, but may be upset or expanded by means of a V-shaped punch or swage $h$ which, when applied to the bar between its edges $e$ can be pressed into the metal, thus spreading the head of the space-bar as shown at $e^2$ in Figs. 1 and 2, so as to overlap a little upon the sides of the rolls to retain them permanently.

Fig. 2 shows the effect of thus expanding all of the space-bars in the cage, producing a contraction of each roll-space $d$ at the outer ends of the space-bars, sufficient to hold the rolls loosely in the cage, to permit their free rotation, but preventing their escape.

It will be noticed that the expansion of the heads of the space-bars operates to contract the roll-space throughout its entire length and also secures the roll permanently in the roll-space, as the heads of the bars cannot by any means be restored to their original shape to release the rolls from the roll-spaces.

As the expanded portions of the heads bear upon the rolls throughout their entire length, they furnish a very extended surface and thus maintain the original dimensions of the spaces in which the rolls are inclosed by the expansion of the head.

Having thus set forth the nature of the invention what is claimed herein is:

1. A cage for a roller-bearing comprising heads connected by space-bars forming continuous sockets or roll-spaces adapted to admit the rolls and support their entire length the outer edges of the space-bars being extended beyond the center of the roll and proportioned to be readily upset and expanded to retain the rolls movably in the said spaces.

2. A cage for a roller bearing comprising heads connected by space-bars forming roll-spaces adapted to admit the rolls, the heads and space-bars being formed integral of malleable metal and the edges of the space-bars being extended outwardly beyond the centers of the rolls and formed of suitable width to be extended over the outer sides of the rolls and retain them movably in the cage.

In testimony whereof I have hereunto set my hand.

CHARLES S. LOCKWOOD.